United States Patent [19]
Rahman et al.

[11] Patent Number: 5,428,623
[45] Date of Patent: Jun. 27, 1995

[54] SCANNABLE INTERFACE TO NONSCANNABLE MICROPROCESSOR

[75] Inventors: Mizanur M. Rahman, Cupertino; Fred C. Sabernick, Sunnyvale; Jeff A. Sprouse, Mountain View, all of Calif.

[73] Assignee: Tandem Computers Incorporated, Cupertino, Calif.

[21] Appl. No.: 86,341

[22] Filed: Jul. 1, 1993

[51] Int. Cl.[6] .............................. H04B 17/00
[52] U.S. Cl. ................... 371/22.3; 371/22.1
[58] Field of Search ............. 371/22.3, 22.1; 324/158 R

[56] References Cited

U.S. PATENT DOCUMENTS

| | | | |
|---|---|---|---|
| 4,780,874 | 10/1988 | Lenoski et al. | 371/22.3 |
| 5,132,974 | 7/1992 | Rosales | 371/22.3 |
| 5,260,649 | 11/1993 | Parker et al. | 324/158 R |
| 5,301,156 | 4/1994 | Talley | 365/201 |

Primary Examiner—Robert W. Beausoliel, Jr.
Assistant Examiner—Glenn Snyder
Attorney, Agent, or Firm—Townsend and Townsend Khourie and Crew; Philip H. Albert

[57] ABSTRACT

A diagnostic system for diagnosing states of circuit elements is described, wherein scannable circuits can be scanned without disturbing the state of unscannable circuits or violating protocols of busses on which unscannable devices are attached. One unscannable device is a standardized microprocessor. A processor interface circuit is coupled between the microprocessor and scannable processor circuits, via a processor bus, to insulate the scannable processor circuits from the unscannable microprocessor. The processor interface circuit is also scannable, including memory elements which affect the bus, by preventing a scan when the bus is in use. A scan is prevented through the use of a maintenance request signal from a scan controller to the processor interface circuit, and one or more maintenance approval signals from the processor interface circuit to the scan controller.

6 Claims, 5 Drawing Sheets

SCANNABLE INTERFACE TO NONSCANNABLE MICROPROCESSOR

BACKGROUND OF THE INVENTION

The present invention relates to the field of digital processing systems with diagnostic capabilities. More specifically, in one embodiment, the invention provides a means for scanning scannable processor circuitry without disturbing a nonscannable microprocessor which forms part of a digital system.

To fully diagnose a logic-only circuit (i.e., no memory of past states), a diagnostic system need only control the overall inputs to the circuit, and record the outputs. The outputs for a known set of inputs, when compared to an expected set of outputs, will indicate whether the circuit is working properly. Circuits with memory elements, such as flip-flops, latches, and memory storage cells, are more complicated to diagnose.

To fully diagnose circuits with memory elements, not only must the inputs be controlled, but the internally remembered states must be known and controllable. Some internal states can be controlled by manipulation of the inputs to the circuit. For example, the internal state of a counter, i.e., its count, can be controlled by asserting a reset input of the counter to reach a known state, then clocking the clock input to reach the desired internal state. This, of course, is not practical with today's complex circuits. Furthermore, for certain tests, the internal state might need to be set to a state which is not reachable through mere manipulation of the circuit's inputs.

What is needed is a means for reading the internal state of the circuit and for setting the internal state to a specific state. With discrete circuitry, an internal state can be done by probing each memory element and setting a known state can be set by gating off each memory element output and substituting a logic value consistent with the desired internal state. With integrated circuitry, however, the number of pins over which signals can be communicated between a test system and the integrated circuit severely limits the number of pins which can be allocated to internal state testing and control.

One well-known method of dealing with diagnostics in integrated circuits (IC's) is to include a scan path among the logic of the circuit. A scan path is a serial path linking all the memory elements of a circuit, or at least those which are to be scannable elements, into a serial stream. Placing the elements in a serial scan path allows the internal state to be read serially from one pin, and allows the internal state to be set with one pin.

The integrated circuit has a mechanism for switching from a normal circuit operation mode to a test mode. In the normal circuit operation mode, a memory element is responsive to its inputs, and in a test mode, the memory element is responsive to data passing along the scan path. Consequently, shifting data into and out of the scan path will cause the outputs of the memory element to change as the data shifts by. If the memory element is one which directly affects the output of the circuit, the shifting of test data on the scan path will appear as data rippling over the outputs of the circuit.

To set the circuit to a known state (scan in), settings for each memory element in the scan path are scanned into a scan input, and to read the state of the circuit (scan out), data is read from a scan path output. The scan in and scan out is performed by clocking the scan path by a number of clocks equal to the number of memory elements in the scan path. Of course, a scan enable must be provided, which when not asserted allows for normal operation of the circuit. Thus, in normal operation, the circuit behaves as designed, and when the scan enable is asserted, the circuit behaves as a serial register encompassing all the diagnosable memory elements.

FIG. 1 illustrates this concept. FIG. 1 shows a parallel register 10, with 8 bits of data input, 8 bits of data output, a clock input, an input for a scan enable signal, a scan data input, and a scan data output. Register 10 operates as a register when the scan enable signal is not asserted, with data passing from the inputs $I_0$–$I_7$ to the outputs $O_0$–$O_7$ with the clock.

When a scan enable signal is asserted, the data inputs no longer affect the data outputs. Instead, the data outputs are affected by the data scanned into the register via the scan data input using the clock. The current internal state of register 10 is read out at the scan data output. This scanning process presents a problem where register 10 is part of a larger system. Suppose register 10 contains all zeros, and "10000000" is to be scanned in, where the "1" is to end up as bit 7. Because the scan input is coupled to bit 0, the "1" will ripple through each of the outputs as it is being clocked in, thus disturbing any circuit element which depends on the output of register 10, thereby disturbing the states of other circuits.

One solution to the problem of output rippling of register 10 is to place another 8-bit nonscannable latch at the output of register 10, and not clock that latch while a scan is occurring, thus shielding any dependent circuit elements from register 10. However, this leaves no way of testing the now-added nonscannable latch.

Another solution is to coordinate the scan of register 10 with the scan of the dependent elements. However, where the dependent elements are not scannable, such as where the dependent element is an enclosed IC provided by another manufacturer, this solution is not possible.

From the above it is seen that an improved means is needed for scanning a circuit which has dependencies in a nonscannable circuit, such as a microprocessor, without disturbing the operation of those dependent circuits.

SUMMARY OF THE INVENTION

An improved circuit diagnostic system is provided by the present invention.

In one embodiment of a diagnostic system according to the present invention, the diagnostic system can scan everything up to the boundary of a nonscannable circuit element, without disturbing the nonscannable element. One such diagnostic system for a digital computer is a processor board comprising scannable processor ASIC's (Application Specific Integrated Circuits), including a processor interface chip (PIC), which interfaces a nonscannable microprocessor and the other scannable processor ASIC's with a processor bus between the microprocessor and the PIC. A scan controller is provided which reads and writes scan data through the scannable ASIC's, including the PIC. The ASIC's are typically individual chips on a processor board, with each chip having a separately controllable scan path. However, in alternate embodiments, more than one ASIC might be combined on a single chip, or more than one chip might make up a single ASIC. Also, the processor circuitry need not be on a single board.

In particular embodiments, the scan controller is itself an ASIC, a Maintenance and Diagnostic Chip (MDC), which makes requests of the PIC to bus-step the microprocessor. When the MDC requests a bus-step, the microprocessor and the processor ASIC's run normally, until the PIC determines that the microprocessor can be held up and that the PIC can be scanned without violating the bus protocol. At that point, the microprocessor is held up, waiting for a response from the PIC. Because the microprocessor is expecting the wait, a delay in getting the response will not necessarily affect the state of the microprocessor.

One advantage of the present invention is that the processor board, up to the processor bus, can be scanned without disturbing the state of the microprocessor. This is useful where a computer system including a nonscannable microprocessor needs to be tested, set into a known state, or debugged in a setting closely aligned with a normal operation setting.

Another advantage of the present invention is that it also allows for the processor board to be bus-stepped without requiring any special hardware in the microprocessor. If no special hardware is needed, then a standard microprocessor chip could be used.

Yet another advantage of the present invention is that it allows clock cycle single-stepping of the scannable ASIC's without interference from the microprocessor. Some diagnostics can be run even without the presence of the microprocessor.

A further understanding of the nature and advantages of the inventions herein may be realized by reference to the remaining portions of the specification and the attached drawings.

DESCRIPTION OF THE PREFERRED EMBODIMENTS

Figure 1:
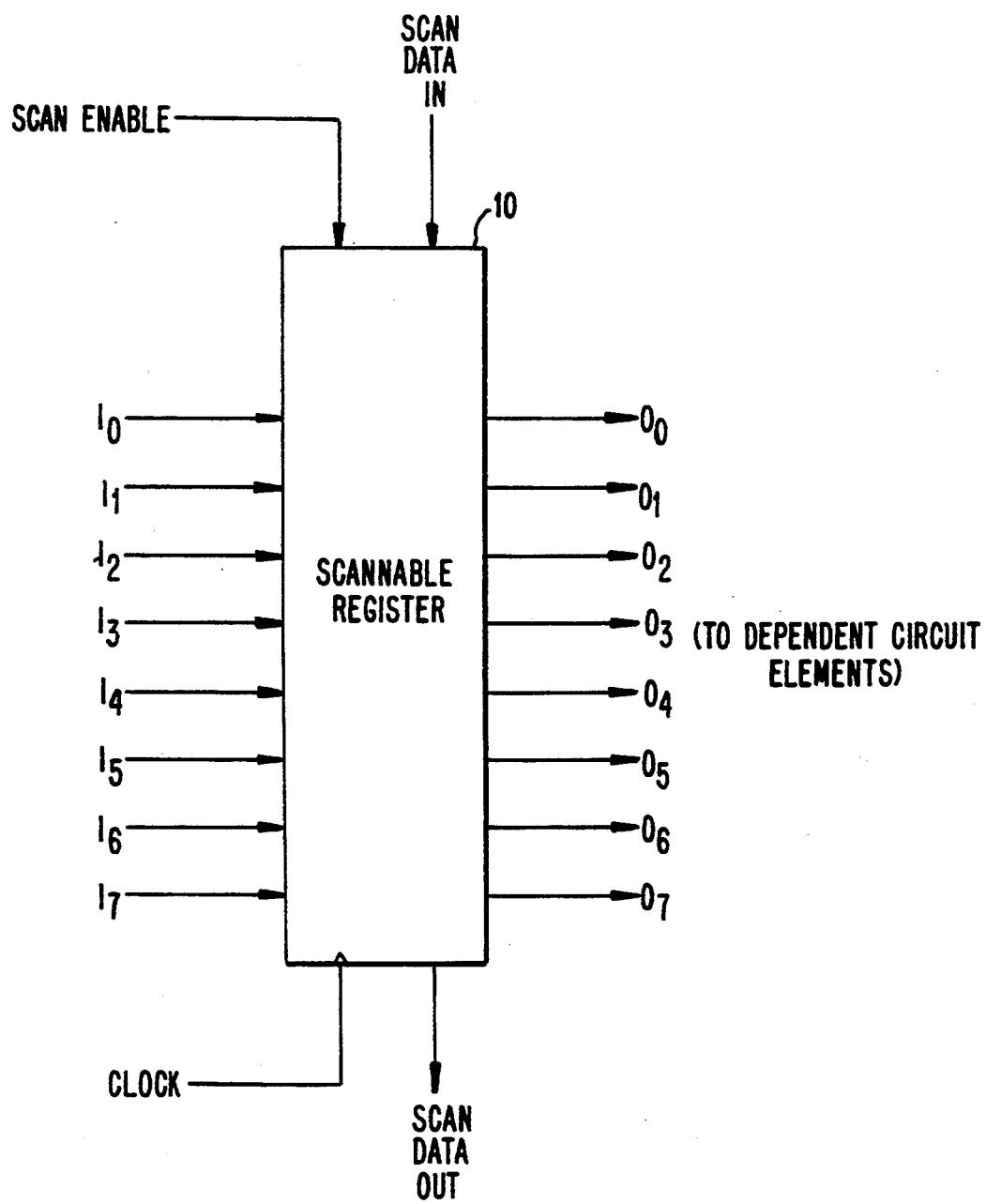
FIG. 1 is a block diagram of a typical scannable register.
Figure 2:
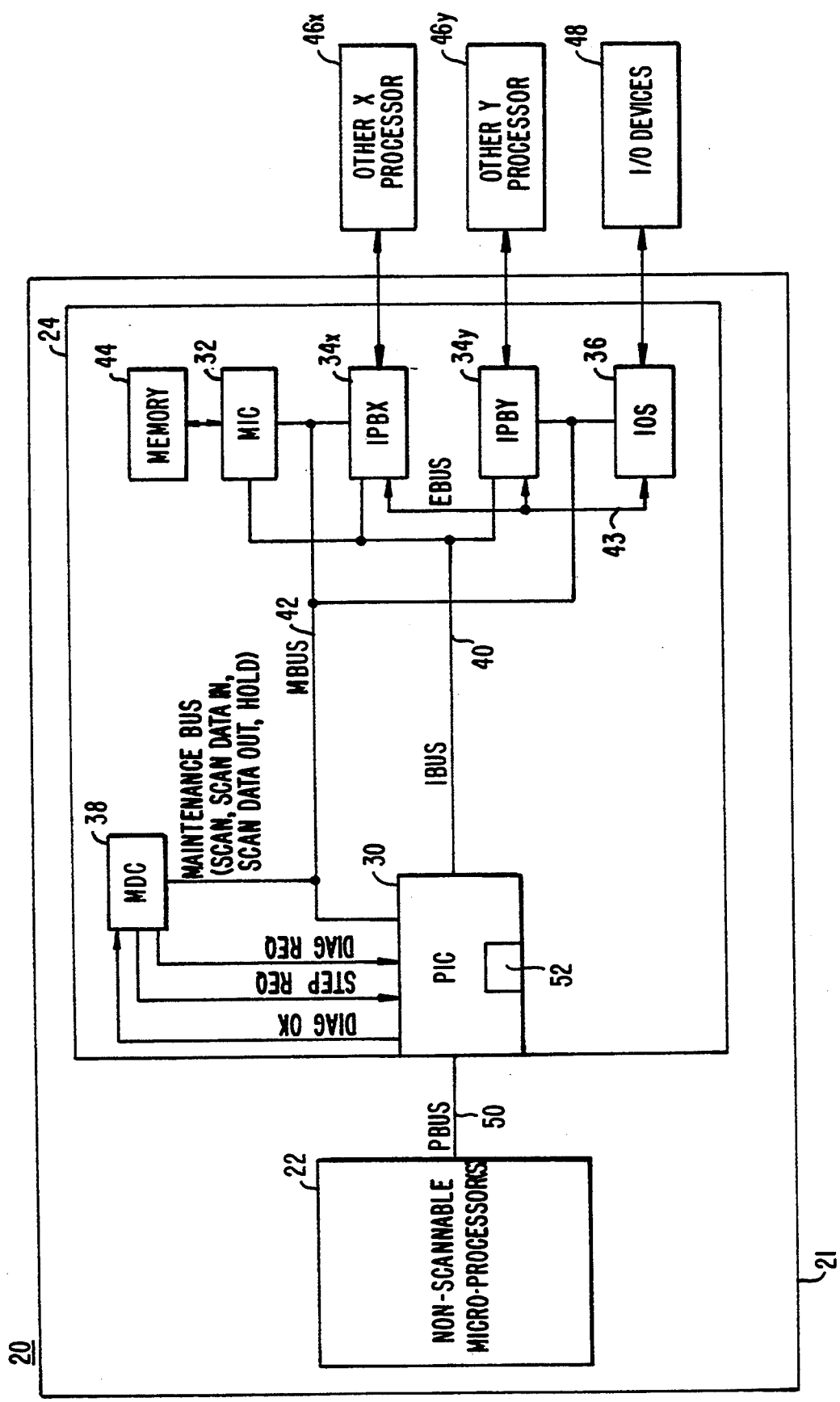
FIG. 2 is a block diagram of a digital computer with a nonscannable microprocessor and processor circuitry.

FIG. 2 is a block diagram of a digital computer system 20 with a nonscannable microprocessor 22 and scannable processor circuitry 24 on a processor board 21. Processor circuitry 24 includes a variety of ASIC's such as a processor interface chip (PIC) 30, a memory interface chip (MIC) 32, interprocessor bus controllers 34x,y (IPBX/IPBY), input/output controller system (IOS) 36 and a maintenance and diagnostic chip (MDC) 38. Processor circuitry 24 is interconnected by three busses, an internal bus (IBus) 40, a maintenance bus (Mbus) 42, and an external bus (EBus) 43. Processor circuitry 24 is shown in FIG. 2 interfacing to a memory 44 via the MIC, to other processing units 46x,y via interprocessor controllers 34x,y, and to I/O devices 48 via IOS 36 and EBus 43. PIC 30 includes state machines, shown in more detail in FIG. 5, whose operation is discussed in connection with FIGS. 3 and 5.

The Mbus contains signal lines for controlling the scan of the ASIC's attached to the Mbus, allowing the MDC to set up an ASIC for a scan operation or to hold its state in place. Holding the state of one ASIC in place allows the MDC to scan another ASIC without disturbing the state of the held ASIC. The Mbus also contains scan data lines used for writing scan data into an ASIC and for reading scan data out of an ASIC.

In addition to the Mbus, the MDC interfaces with the PIC over three lines, DIAG_REQ, STEP_REQ, and DIAG_OK, although in some embodiments, the information provided by these signals is distributed over a different set of signal lines.

In the normal operation mode of digital computer system 20, the Mbus is not needed. Microprocessor 22 issues requests to the PIC over a processor bus (PBus) 50, which in turn relays the requests over the IBus to other ASIC's. For example, if microprocessor 22 requests a memory write, the request will include the data to be written and will be passed from the PIC to the MIC for storage of the data accompanying the request into memory 44. Similarly, a read request for a given block of memory 44 is sent from microprocessor 22 over the PBus to the PIC, and then from there to the MIC over IBus 40. In response, the MIC retrieves the data from memory 44 and passes it to the PIC, which relays it to microprocessor 22 at the appropriate time in the PBus protocol.

In a diagnostic mode, the MDC can control the ASIC's over the Mbus. Although the Mbus is shown leading to each ASIC individually, in some embodiments, the scan path through the ASIC's is serial, i.e., all the scan data runs through each ASIC. The latter configuration is useful where a connection between two ASIC's is less costly than the connections from each ASIC to the MDC.

One means for controlling diagnostics of an ASIC, such as MIC 32, for example, is by scanning a desired state into the ASIC, over the Mbus. Because each ASIC within processor circuitry 24 is scannable, the state of the ASIC can be monitored and changed. Therefore, the MDC need not be concerned with the internal operation of the ASIC's interacting on the IBus since the states of all scannable ASIC's can be scanned in or held. For example, during a scan operation, the MIC can be scanned in such a way that the rippling of the scan bits appears on the IBus, but this is not a problem if each ASIC on the IBus is also under the control of the MDC.

Generally, when an ASIC is being scanned, the ability of the inputs to the ASIC to affect the state of the circuitry inside the ASIC is blocked. In the case where all the ASIC's are coupled on a serial scan path, when one ASIC is scanned, they are all scanned, so the effect of the rippling of the scan bits on the IBus is of little concern. In the case where each ASIC has a scan path directly connected to the MDC, the MDC can issue a hold command over the Mbus to all ASIC's which are not being scanned, to prevent the rippling on the IBus from triggering an undesirable input to the unscanned ASIC's. In summary, because the ASIC and its surrounding environment is fully controllable by the MDC, the Mbus is all that is needed between the MDC and that ASIC. The exception to this rule, shown in FIG. 2, is PIC 30, which has an interface to microprocessor 22, which is not controllable by MDC 38.

Figure 3:
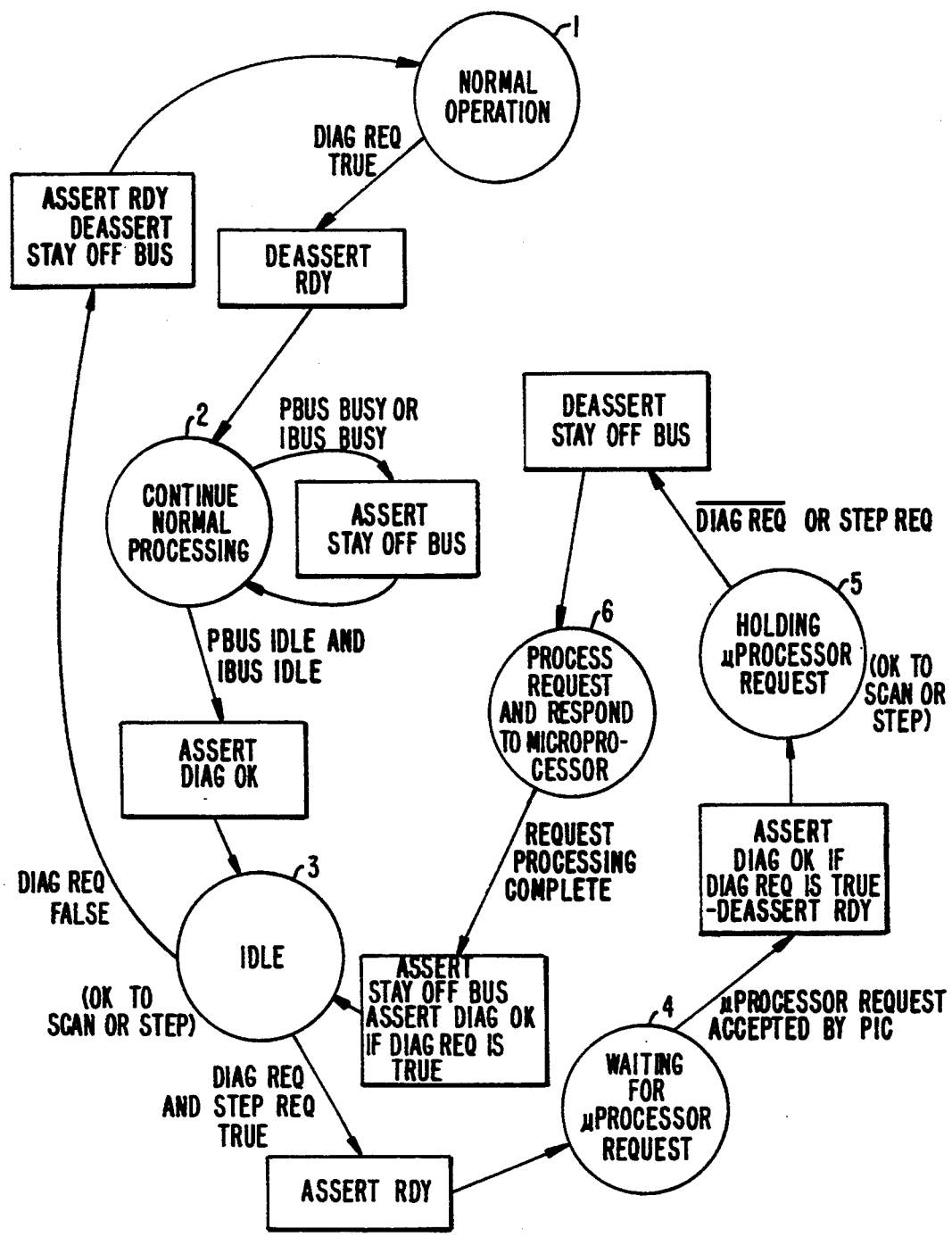
FIG. 3 is a state diagram of a protocol between a PIC and an MDC for performing scans or processor bus steps without disturbing the operation of a microprocessor on the processor bus.

The PIC is freely scannable by the MDC without regard to the status of the PBus, except for memory elements which would affect the signals put out on the PBus, but even those memory elements are scannable when provided with the control logic embodied in the state diagram shown in FIG. 3. These signals comprise M address/data lines and K control lines for a total of N lines. In one embodiment, 6 control lines (K=6) and 82 address/data lines (M=82; N=88). These lines are shown in greater detail in FIG. 4. When certain conditions are met, microprocessor 22 will not be affected by the signals on the address/data lines. These conditions are met when control signals passed from the PIC to the microprocessor indicate that the data on the address-/data lines is not valid. Another such condition is when microprocessor 22 is waiting for a response to a microprocessor request and a "response ready" signal from the PIC to the microprocessor has not yet been asserted by the PIC. Thus, the MDC must assure that the PBus is in a condition such that a scan can occur without causing undesired operation of microprocessor 22.

FIG. 3 is a state diagram showing the various protocol states between the MDC and the PIC. The state is tracked by a state machine 52 (see FIG. 5) within the PIC, although other configurations are possible. Significantly, even this state machine 52 is scannable.

Figure 5:
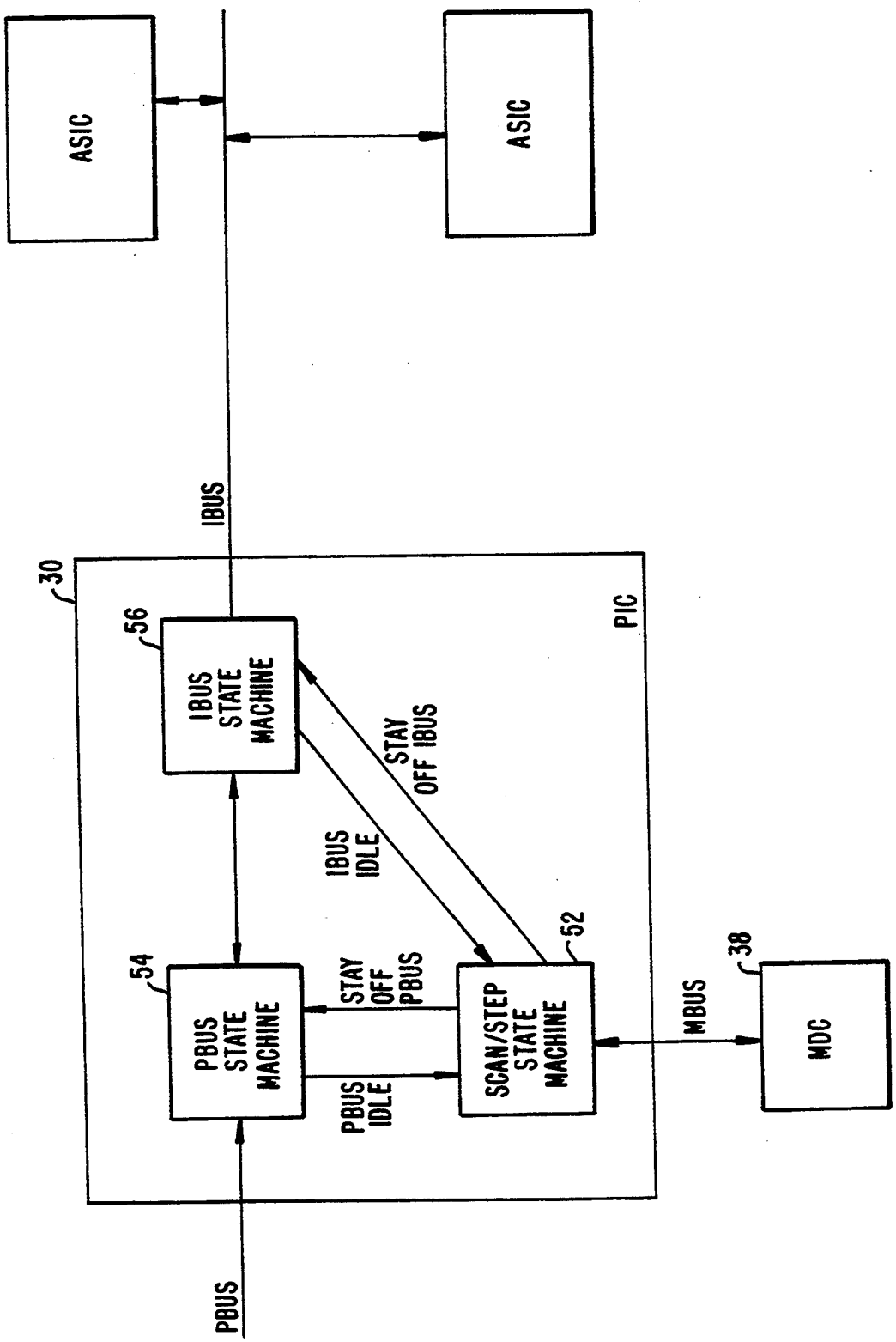
FIG. 5 is a block diagram of the PIC showing diagnostic state machines.

FIG. 5 shows PIC 30 in greater detail. PIC includes state machines 52, 54, 56. Signal connections are provided for state machine 52 to send a stay_off_PBus signal to PBus state machine 54 and a stay_off_IBus signal to IBus state machine 56, as well as signal connections for receipt by state machine 52 of a PBus_idle signal from PBus state machine 54 and an IBUS_idle signal from IBus state machine 56.

In state 1, the PIC and the MDC are in the normal operating mode. The state machine 52 changes from state 1 to state 2 when the DIAG_REQ signal is asserted. Throughout this description, the signal may be interchangeably referred to as an "asserted" signal or a signal with a value of "true" with the opposites being a "deasserted" signal and a signal with a value of "false". The DIAG_REQ signal is asserted by the MDC when a scan of the PIC, a bus-step of the PBus or a single clock cycle step of the clock of processor circuitry 24 is desired.

Upon changing to state 2, the PIC deasserts a RDY (ready) signal. The RDY signal represents two signals, RdRdy (read ready) and WrRdy (write ready), but for clarity, since the signals are treated identically within state machine 52, they are shown in FIG. 3 as a single signal. These signals, RdRdy and WrRdy are output by the PIC over the PBus, and are input by microprocessor 22. Another signal, stay_off_bus, is asserted each clock cycle in which the state remains state 2. As with the RDY signal, the stay_off_bus signal also represents two similarly treated signals, a stay_off_PBus and a stay_off_IBus signal, which are output by state machine 52 to state machines 54 and 56 (see FIG. 5). State machine 52 remains in state 2 until both the PBus and the IBus are idle with respect to the PIC, at which point state machine 52 changes to state 3.

The stay_off_bus signal is sent to state machines 54, 56, and state machine 52 stays in state 2 until it receives a bus idle signal from both state machines 54, 56.

Upon changing to state 3, the PIC asserts the DIAG OK_signal, which indicates to the MDC that stepping and scanning are allowed. State machine 52 remains in state 3 until either the MDC deasserts DIAG_REQ or the MDC asserts the STEP_REQ signal. If the MDC deasserts the DIAG_REQ signal, state machine 52 changes to state 1, and the flow for a scan operation is completed. Upon changing to state 1, the PIC asserts RDY (RdRdy, WrRdy) and deasserts stay_off_bus.

On the other hand, if the MDC maintains the DIAG_REQ signal asserted and asserts the STEP_REQ signal, the state machine changes to state 4, to begin a single bus step of the PBus. Upon changing to state 4, the PIC asserts the RDY signal, and waits in state 4 until a microprocessor request occurs. Because the bus step runs until the next processor request occurs, it is not a single step of the microprocessor clock, but is rather a single block of code between two requests. Of course, with some microprocessors, a request for an instruction occurs each instruction cycle, but in a preferred embodiment, microprocessor 22 maintains a secondary cache for caching instructions and recently used data, making it possible to run for several instruction cycles without needing to interact with the PIC.

State machine 52 remains in state 4 until the PIC has accepted the microprocessor request, and then changes to state 5. Upon changing to state 5, the PIC asserts DIAG_OK if DIAG_REQ is still true, and also deasserts RDY. This causes microprocessor 22 either to wait for the results of the request, or to continue internal processing (such as reading instructions from its primary or secondary cache). Either way, the PBus is not used.

The state machine remains in state 5 until the MDC either deasserts DIAG_REQ or asserts STEP_REQ. In either case, the state transitions are from state 5 to state 6, and then to state 3. From state 3, if the signals from the MDC have not changed, the former case causes a transition to state 1, and the latter to state 4.

Upon entering state 6, the PIC deasserts the stay_off_bus signal, to allow the request to be processed by processor circuitry 24. State machine 52 remains in state 6 until the request processing is complete and a response is sent to microprocessor 22, and then transitions to state 3. Upon the transition to state 3, the PIC once again asserts stay_off_bus and asserts DIAG_OK for one clock cycle if DIAG_REQ is still true.

Thus, according to the state diagram shown in FIG. 3, the PIC and the MDC can coordinate times for scanning processor circuitry 24, including the PIC itself, and for bus stepping microprocessor 22 and PBus 50, without microprocessor 22 even being aware of what is happening. This eliminates the need for modifications to microprocessor 22. But one benefit of such an arrangement is that microprocessor 22 could be selected from available microprocessors without limiting the selection to those microprocessors which are scannable. In one embodiment, microprocessor 22 is two R4400 microprocessors (manufactured by the MTI division of Silicon Graphics, Inc.) operating in tandem.

Of course, if the PIC is fully scannable, then the ripple of a scan appearing on some control lines of the PBus might still affect microprocessor 22. For example, if a flip-flop normally outputs a value for the RDY signal, when the scan path running through that flip-flop is scanned, the RDY output will ripple in the pattern of the bits of the memory elements in the scan path. Thus, to avoid undesirable operations, some memory elements cannot be directly connected to the PBus. However, some means is needed to test these memory elements.

Table 1 shows several signals which are output by the PIC onto the PBus which must be held during a scan ("*" indicates that a signal is active low).

TABLE 1

| Signal | Value |
| --- | --- |
| ValidIn* | False |
| ExtRqust* | False |
| RdRdy* | False |
| WrRdy* | False |
| IvdAck* | True |
| IvdErr* | False |

ValidIn* is a PBus line on which the PIC indicates that the data driven onto the PBus by the PIC is valid. ExtRqust* is a PBus line on which the PIC sends a request to the microprocessor. RdRdy* and WrRdy* were previously discussed. InvAck* and InvErr* are PBus lines on which the PIC indicates the successful and unsuccessful completion, respectively, of an invalidate/update request made by the microprocessor.

During a scan operation, the PIC must maintain the status of these bit lines, since the signals on these lines are part of the PBus handshaking protocol between the microprocessor and the PIC. However, it is not enough to merely leave out of the scan path any memory elements which affect these lines, as that would preclude diagnostics which read or write these lines.

Figure 4:
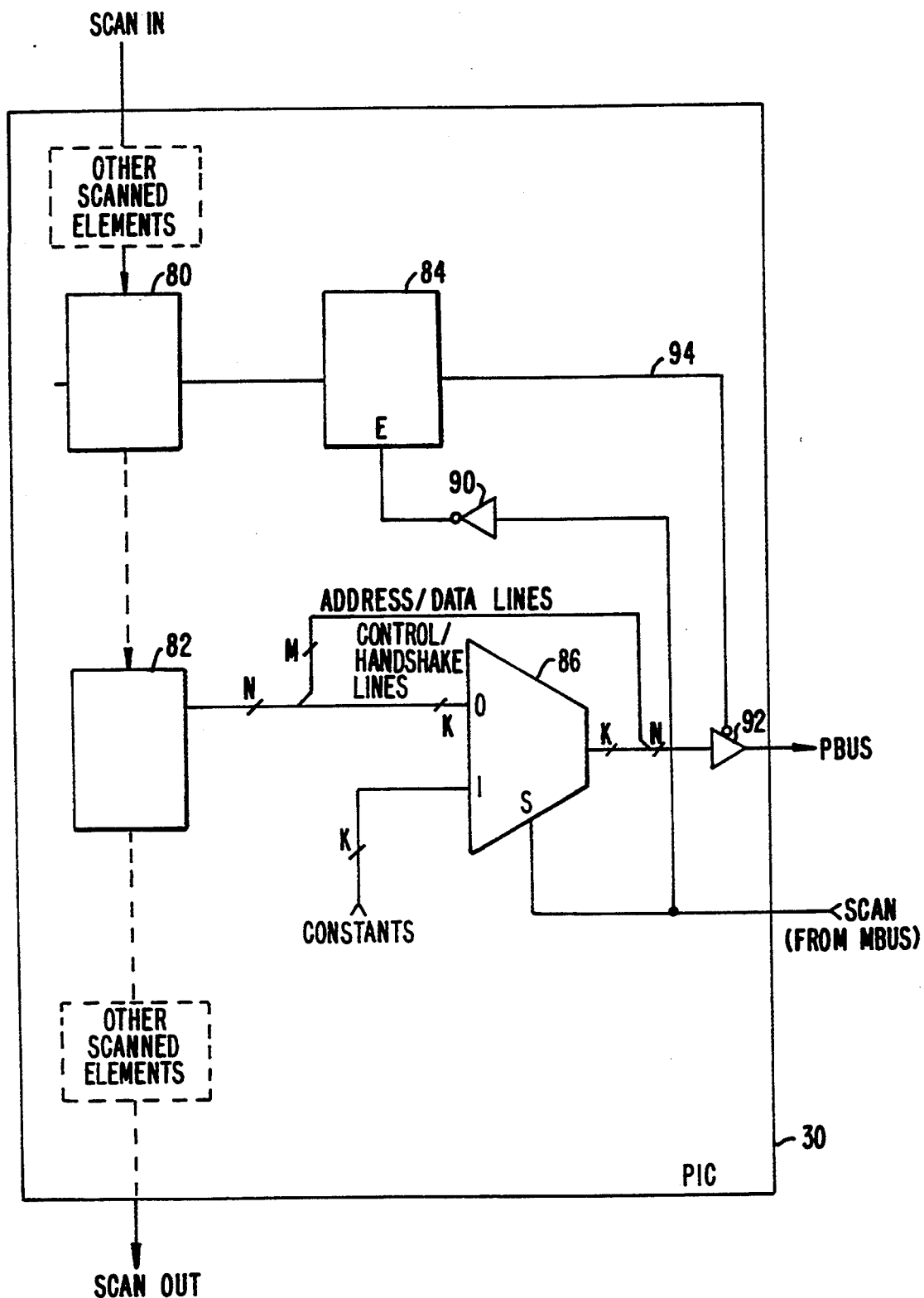
FIG. 4 is a block diagram of an output enable latch circuit and a processor bus handshake signal register circuit according to the present invention.

FIG. 4 illustrates how the PIC is made fully scannable, while at the same time providing fixed outputs during a scan when necessary. FIG. 4 shows a one-bit memory element 80, an N-bit memory element 82, an M-bit latch 84, a K-bit 2-to-1 multiplexer 86, an invertor 90, and an N output driver 92. The actual configuration may vary from embodiment to embodiment, but the essential features are the same. For example, memory element 82 is shown for clarity as a single device, where in some PIC's, the functionality of memory element 82 is distributed throughout the PIC.

In the example of FIG. 4, an output enable signal which is output during normal operation of the PIC is output from memory element 80 to latch 84, which outputs its inputs to an enable input of output driver 92, when a signal applied at an enable (E) input of latch 84 is low (active). N signals are output from memory element 82 to either multiplexer 86 (K signals) or directly to output driver 92 (M signals). The K signals going to multiplexer 86 are control lines coupled to the PBus when a select signal is not asserted (i.e., false, or "0") at a select (S) input to multiplexer 86. When the E input to latch 84 is false, latch 84 latches its input to its output, and when the S input to multiplexer 86 is asserted (select input set to "1"), multiplexer 86 inputs a preselected set of constants from its "1" input and outputs them onto the K control lines of the PBus.

The use of the circuitry shown in FIG. 4 will now be described. During a scan operation, the PBus should not be affected. Therefore, any PBus line which is being driven during a scan should be one of the K lines output by multiplexer 86. The K signals shown in Table 1 are examples of signals which are always the same value during a scan. Thus, the first column of Table 1 lists some signals which would be part of the K lines from memory element 82 to the "0" input of multiplexer 86, and the second column shows the constants which would be applied to the "1" input of multiplexer 86.

Within the PIC, at least one memory element (a flip-flop) maintains a bit indicating whether or not the PIC is the current PBus master. For illustration purposes, assume that this bit is stored in memory element 80. When a scan begins, the scan signal line is set true, causing the E input to latch 84 to go false, which latches the bit onto line 94 which connects to the enable input of output driver 92. By the way, the enable input might fan out to each bit of output driver 92. Also, the K constant bits are output onto the PBus.

With the configuration shown in FIG. 4, all memory elements of the PIC are scannable, except for latch 84. This should not be a problem, since latch 84, when a scan is being performed, merely reflects the contents of memory element 80. Note that memory element 80 and 82 are scannable. FIG. 4 shows them on the scan path. The scan path runs from the Mbus through each memory element on the scan path, where memory elements 80 and 82 can be anywhere along the scan path. Also, to be fully scannable, the state machine 52, itself, is also scannable, since it contains at least three bits of memory to remember the current state, which is one of six values.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A diagnostic system for diagnosing states of circuit elements within a digital computer where internal states of a microprocessor in the digital computer are not available for control by the diagnostic system, comprising:

a plurality of scannable processor circuits;

a processor interface circuit coupled to the microprocessor via a processor bus and coupled to said plurality of scannable processor circuits via an internal bus, wherein said processor interface circuit interfaces with the microprocessor using a predetermined bus protocol over said processor bus;

a scan controller coupled to said plurality of scannable processor circuits and said processor interface circuit, wherein said scan controller is capable of reading out and modifying internal states of said plurality of scannable processor circuits and said processor interface circuit;

a first signal means for providing a maintenance request signal from said scan controller to said processor interface circuit;

a second signal means for providing a maintenance approval signal from said processor interface circuit to said scan controller; and means within said processor interface circuit and coupled to said processor bus, for ensuring that said maintenance approval signal is not asserted if said predetermined bus protocol would be violated by a change of an internal state of said processor interface circuit.

2. The apparatus of claim 1, further comprising:

a first state machine within said processor interface circuit which holds an indication of a diagnostic state, said first state machine including outputs for a first signal and a second signal, said first signal indicating that said diagnostic state is to become an idle state after said processor bus is idle and said second signal indicating that said diagnostic state is to become an idle state after said internal bus is idle;

a second state machine within said processor interface circuit which holds an indication indicating that said processor bus is not to be accessed, said second state machine controlled by said first signal; and a third state machine within said processor interface circuit which holds an indication indicating that said internal bus is not to be accessed, said third state machine controlled by said second signal.

3. The apparatus of claim 1, wherein said maintenance request signal comprises a request signal and a maintenance type signal, where said maintenance type signal requests either a scan or a bus step, and wherein said processor interface circuit comprises logic to perform a scan and logic to perform a bus step in response to said maintenance type signal.

4. The apparatus of claim 1, wherein each of said plurality of scannable processor circuits, said processor interface circuit, and said scan controller are individual integrated circuit chips mounted on a processor board with the microprocessor.

5. A method of diagnosing scannable circuit elements which are coupled in a circuit including unscannable circuit elements, comprising the steps of:

isolating the unscannable circuit elements from the scannable elements over a known interface, said known interface connecting the unscannable circuit elements to a scannable interface element;

asserting a first signal requesting a diagnostic, where said first signal is input to said scannable interface element;

waiting for any in-process bus cycles to complete over said known interface;

holding control signals output by said scannable interface element over said known interface in a fixed state, said fixed state selected such that a state of the unscannable circuit elements is not uncontrollably affected by any unfixed signals on said known interface while said scannable interface element is being scanned.

6. A digital processor system with scannable processor circuits and a nonscannable microprocessor, comprising:

a processor bus which uses a predefined bus protocol and predefined handshaking sequences comprising bus steps to couple the microprocessor to the scannable processor circuits;

a scannable processor interface circuit coupled to said processor bus, said scannable processor interface circuit including logic circuitry which allows said scannable processor interface circuit to perform a bus step of the processor;

a first logical circuit coupled to said scannable processor interface circuit, which performs a bus step of the processor bus such that said scannable processor circuits can be scanned between bus steps without violating said bus protocol;

a second logical circuit, coupled to the scannable processor circuits for single-stepping at least one of the scannable circuits; and a third logical circuit, coupled to the first and second logical circuits, which allows said first and second logical circuits to be included in a scan path through the scannable processor circuits.

* * * * *